(12) United States Patent
Hoogenraad

(10) Patent No.: US 7,878,279 B2
(45) Date of Patent: Feb. 1, 2011

(54) HYBRID GOLF CAR

(75) Inventor: Reinier Hoogenraad, 15740 El Prado Rd., Chino, CA (US) 91710

(73) Assignee: Reinier Hoogenraad, Chino, CA (US)

( * ) Notice: Subject to any disclaimer, the term of this patent is extended or adjusted under 35 U.S.C. 154(b) by 0 days.

(21) Appl. No.: 12/313,456

(22) Filed: Nov. 20, 2008

(65) Prior Publication Data

US 2009/0139785 A1    Jun. 4, 2009

Related U.S. Application Data

(63) Continuation of application No. 11/642,244, filed on Dec. 20, 2006, now abandoned.

(60) Provisional application No. 60/753,662, filed on Dec. 23, 2005.

(51) Int. Cl.
*B60K 6/20* (2007.10)

(52) U.S. Cl. .................. 180/65.21; 180/213; 180/216; 180/65.23

(58) Field of Classification Search ............... 180/65.2, 180/65.25, 208, 65.1, 216, 213, 65.21, 65.23, 180/65.275, 65.28
See application file for complete search history.

(56) References Cited

U.S. PATENT DOCUMENTS

| | | | | | |
|---|---|---|---|---|---|
| 3,043,389 | A | * | 7/1962 | Steinberg | 180/208 |
| 3,777,836 | A | * | 12/1973 | Riza | 180/213 |
| 4,089,542 | A | * | 5/1978 | Westerman | 280/639 |
| 4,522,281 | A | * | 6/1985 | Snider | 180/208 |
| 4,573,549 | A | * | 3/1986 | Pankow | 180/216 |
| 5,497,941 | A | * | 3/1996 | Numazawa et al. | 237/2 A |
| 5,820,172 | A | * | 10/1998 | Brigham et al. | 180/65.26 |
| 6,260,644 | B1 | * | 7/2001 | Otsu | 180/65.25 |
| 6,397,961 | B1 | * | 6/2002 | Sutton | 180/65.1 |
| 7,278,507 | B2 | * | 10/2007 | Walworth | 180/208 |
| 2007/0007056 | A1 | * | 1/2007 | Bowers et al. | 180/65.2 |

* cited by examiner

*Primary Examiner*—Hau V Phan
(74) *Attorney, Agent, or Firm*—Rader Fishaman Grauer

(57) ABSTRACT

A hybrid golf car type vehicle powered by a gasoline engine or an electric motor in the forward direction and by the electric motor in the reverse direction with the gasoline engine charging the batteries when the batteries fall below a threshold charge either with a motor generator or an alternator.

14 Claims, 4 Drawing Sheets

HYBRID GOLF CAR

This application is a continuation of U.S. patent application Ser. No. 11/642,244, filed Dec. 20, 2006 now abandoned, and claims the benefit of U.S. Provisional Application No. 60/753,662, filed on Dec. 23, 2005.

This application incorporates by reference the entire specification and disclosure of U.S. Provisional Application No. 60/753,662.

FIELD OF THE INVENTION

The present invention is directed to a hybrid golf car type vehicle. This type of vehicle used by golfers, gardeners and maintenance people in a park or development, and by people on residential streets where high speeds, such as 60 miles-per-hour are rare and not required.

BACKGROUND OF THE INVENTION

Golf car type vehicles have been around for at least 60 years. Originally, both gasoline engine powered and electric motor powered golf cars were available. Because of improvements in motor technology and battery technology, electric powered golf car type vehicles have prevailed. However, gasoline powered golf car type vehicles are available and are used in situations where higher speeds are required and/or higher loads are being carried or towed.

Hybrid automobiles have become very popular over the last decade. These automobiles have both a gasoline engine and an electric motor connected to a transmission and have a relatively large battery pack to power the electric motor. The hybrid vehicle has been successful primarily because of technology advancements in the transmission and technology advancements in batteries. Batteries based on a given weight have a far greater charge or ability to take a charge than the batteries of 20 or 30 years ago. It has been the computer controlled transmission that has really made the hybrid vehicle possible. At high speeds and/or high loads or at low battery charges, the transmission is driven primarily by the gasoline engine. At lower speeds when there is a sufficient charge, the electric motor handles most of the power requirements for the vehicle. When the vehicle comes to a stop, such as at a stop sign or a signal, if the gasoline engine is operating, after being stopped for a predetermined period of time, such as two or three seconds, the engine is turned off. When the driver commences to move the car, the transmission is powered by the electric motor, first. The engine is started when the car moves out and kicks in to take up the power requirements during acceleration. Use of sophisticated computer controlled transmissions has not made its way to the golf car type vehicles for a variety of reasons, including cost, weight and power losses that are experienced through any transmission. For a vehicle having an engine from 100 to 200 horsepower, the power losses through the transmission are de minimus. However, for a golf car type vehicle where the electric motor is normally in the 5 to 10 horsepower and a gasoline engine is from 7.5 to 15 horsepower range, the power losses in a transmission are prohibitive.

An electric motor powered golf car type vehicle normally is easy to place in reverse by activating a switch that reverses the polarity of the current being fed to the motor and reverses direction of the motor. When the golf car is powered by a gasoline engine, reversing directions of a golf car type vehicle becomes relatively complicated and requires at a minimum a clutching system to switch power from one pulley to the other pulley where one pulley powers an endless belt to move the vehicle in a forward direction and the other pulley powers the vehicle to go in a reverse direction. The clutching system activates one pulley or the other pulley depending upon what direction the vehicle wants to go. Because of the power limitations of the gasoline engine for a small golf car type vehicle, the weight of a transmission, the complexity of a transmission, and the cost of a transmission, transmissions having forward direction[s] and at least one reverse direction, have not been widely utilized in small golf car type vehicles. The reverse direction problem has been one of the most difficult problems facing the use of a gasoline powered engine in the golf car type vehicles.

It is an object of the present invention to provide a hybrid type golf car type vehicle which can be powered either with a gasoline engine or with an electric motor. It is a further object to provide a vehicle that can go in a forward direction or in a reverse direction.

It is a further object of the present invention to provide a hybrid type golf car that operates on an electric motor when its battery has sufficient charge to operate the electric motor and which is operated with a gasoline engine which both operates the vehicle and charges the battery when the battery charge falls below a predetermined level.

It is still another object of the present invention to provide a golf car that in the default mode operates with an electric motor either in the forward or reverse direction when the vehicle battery has sufficient charge, and operates with a gasoline engine in the forward direction and charges the vehicle battery when the vehicle battery charge falls below a predetermined level.

SUMMARY OF THE INVENTION

The present is directed to a hybrid golf car type vehicle (also referred to as the "vehicle") comprising a gasoline engine with on and off modes, the off mode being the default mode; a motor generator having a reversible motor mode and a generating mode, the motor mode in the forward direction being the default mode; a drive shaft connected to the motor generator, the motor generator driving the drive shaft in a forward or reverse direction when the motor generator is in the motor mode; a differential connected and driven by the drive shaft; two independent power axles connected to and driven by the differential; a directional drive train connecting the engine to the drive shaft, the engine driving the drive train and the drive shaft in the forward direction when the motor generator is in the generator mode, and the motor generator driving the drive shaft in the forward or reverse direction when the motor generator is in the motor mode; and a battery to power the motor generator in the motor mode, the motor generator charging the battery when the motor generator is in the generator mode.

Preferably, the hybrid golf car type vehicle has a controller monitoring the voltage of the battery and adapted to starting the engine and switching the motor generator to the generator mode when the battery charge drops below a predetermined voltage.

In the preferred embodiment of the present invention, the hybrid golf car type vehicle includes a reversing switch adapted when activated to stop the engine, if running, switch the motor generator to the motor mode, if in the generator mode, and switch the motor generator to a reverse direction, the reversing switch being off when not activated.

In a preferred embodiment of the present invention, a hybrid golf car type vehicle includes an on/off switch to turn on or turn off the vehicle automatic operation which turns on the motor generator in the motor mode in a forward direction when the battery charge is at least equal to a predetermined voltage, or to start the engine when the battery charge is less than the predetermined voltage and switch the motor generator to the generating mode, and when turned off to switch off the motor generator and the engine. Preferably, the on/off switch is connected to the controller and the controller carries out the vehicle automatic operation.

In another preferred embodiment of the present invention, the hybrid golf car type vehicle includes a manual override switch to override the vehicle automatic operation. The manual override switch can be activated to a first on mode which turns off the engine and switches the motor generator from a generator mode to a motor mode in the forward direction regardless of the battery charge. Preferably the manual override switch can be activated to a second on mode which switches the motor generator from the motor mode to the generator mode and turns on the engine regardless of the battery charge. Preferably, the manual override switch is connected to the controller and the controller overrides the vehicle automatic operation.

In a preferred embodiment of the present invention, the hybrid golf car type vehicle has an accelerator to control the power of the motor generator when the motor generator is in the motor mode and to control the power of the engine when the engine is turned on. Preferably, the accelerator is directly connected to the controller and the controller controls the power of the motor sensor in the motor mode and the engine in response to signals from the accelerator.

The present invention is directed to a hybrid golf car type vehicle comprising a gasoline engine with on and off modes, the off mode being the default mode; a motor operable in a forward or reverse direction, the motor in the forward direction being the default mode; a drive shaft connected to the motor, the motor driving the drive shaft in a forward or reverse direction; a differential connected and driven by the drive shaft; two independent power axles connected to and driven by the differential; a directional drive train connecting the engine to the drive shaft, the engine driving the drive train and the drive shaft in the forward direction when the motor is not powered, and the motor driving the drive shaft in the forward or reverse direction when the motor is powered and the engine is turned off; a battery to power the motor; and an alternator to charge the battery when the engine is driving the drive shaft.

Preferably, the hybrid golf car type vehicle has a controller monitoring the voltage of the battery and adapted to starting the engine and turning off the motor when the battery charge drops below a predetermined voltage.

In the preferred embodiment of the present invention, the hybrid golf car type vehicle includes a reversing switch to reverse direction of the vehicle which when activated turns off the engine, switches on the motor, and switches the motor to a reverse direction, the reversing switch being off when not activated. Preferably, the reversing switch is connected to the controller and the controller controls the reversing of direction of the vehicle.

In a preferred embodiment of the present invention, a hybrid golf car type vehicle includes an on/off switch to turn on or turn off the vehicle automatic operation which turns on the motor in a forward direction when the battery charge at least equals a predetermined voltage, or starts the engine and turns off the motor when the battery charge is less than the predetermined voltage, and which when turned off, turns off the motor and the engine. The motor is turned off by cutting off electrical power to the motor. The engine is turned off by turning off the ignition.

In another preferred embodiment of the present invention, the hybrid golf car type vehicle includes a manual override switch to override the vehicle automatic operation. The manual override switch can be activated to a first on mode which turns off the engine and turns on the motor in the forward direction regardless of the battery charge. Preferably the manual override switch can be activated to a second on mode which turns off the motor and turns on the engine regardless of the battery charge. Preferably, the manual override switch is connected to the controller which then controls the override over the vehicle automatic operation.

In a preferred embodiment of the present invention, the hybrid golf car type vehicle has an accelerator to control the power of the motor when it is turned on or to control the power of the engine when it is operating. Preferably, the accelerator is connected to the controller which controls the power of the motor or engine in response to the signals from the accelerator.

When the motor is powered, the engine is off and when the engine is operating, the motor is turned off.

In the preferred embodiment of the present invention, the on/off switch is directly connected to the controller.

In the preferred embodiment of the present invention, the reverse switch is connected directly to the controller and the controller carries out and the controller reverses direction of the vehicle.

In the preferred embodiment of the present invention, the manual override switch is connected directly to the controller and the controller carries out the commands of the first on mode and second on mode of the manual override switch.

In another preferred embodiment of the present invention, the accelerator is connected directly to the controller and the controller controls the power of the motor generator when the motor generator is in the motor mode and controls the power of the engine when the engine is on.

In the preferred embodiment of the present invention, the hybrid golf car type vehicle has a starter motor to start the engine. The started motor is connected to the on/off switch which activates the starter motor for a predetermined time to start up the engine. In a preferred embodiment of the present invention, the starter motor is connected directly to the controller and the controller activates the starter motor for a predetermined time to start the engine. Preferably, the controller monitors the on/off status of the engine and activates the starter motor periodically when the vehicle on/off switch is turned on and the battery charge is below a predetermined value or the manual override switch is activated to operate the engine until the engine starts.

DETAILED DESCRIPTION OF THE INVENTION

Figure 1:
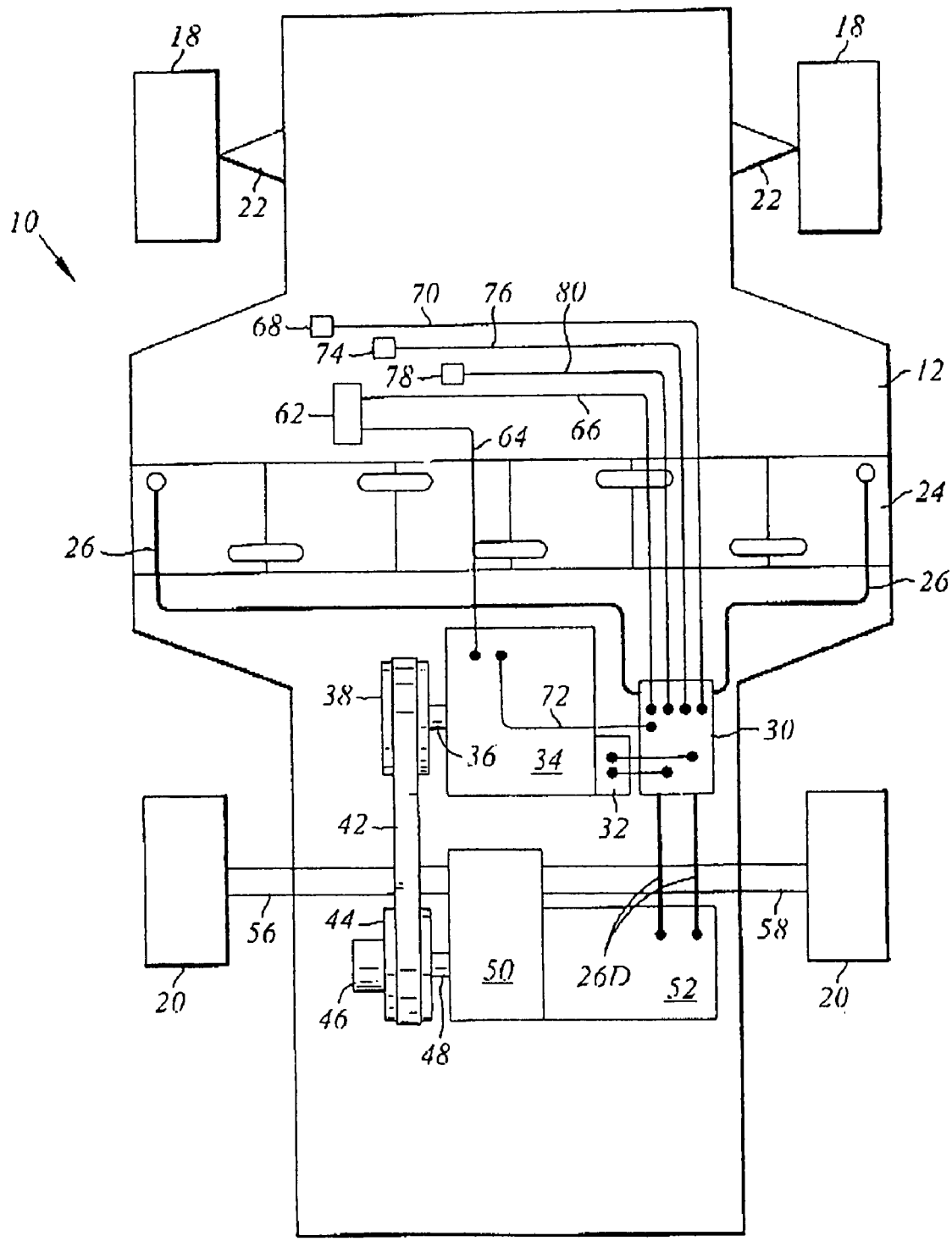
FIG. 1 is a symbolic representation of the layout of the hybrid golf type vehicle of the present invention.

Referring to FIG. 1, the hybrid golf car type vehicle 10 of the present invention has a frame 12 with front wheels 18 supported by suspension 22 and rear drive wheels 20 driven by drive axles 56A and 56b, respectively. A battery pack 24 ("battery" herein) is situated on the frame and is connected to a control box 30 via battery cables 26 which extend to a motor generator 52 through battery cables 26D. Most vehicles 10 operate on nominal 48-volt systems using an array of six 8-volt batteries connected in series. The control box 30 contains a microprocessor and switch controls and controls operation of the vehicle. The control box 30 can be made up of several separate independent components that are not combined in one unit. For ease in describing the invention, we have referred to the controls collectively as the control box 30. The control box has leads to starter 32. The starter 32 is electrically powered and is used to start the gasoline engine 34. A sensor (not shown) on the engine is connected to the control box and the control box monitors the on/off status of the engine. The sensor can measure intake manifold pressure or engine rpm's to determine if the engine is on. The engine drive shaft 36 extends out of the left side of the engine and a torque converter/centrifugal pulley 38 is mounted thereon. An endless belt 42 is fitted to the pulley and the other end of the endless belt is connected to a second torque converter/centrifugal pulley 44. Centrifugal pulleys 44 and 38 have reverse actions. As pulley 38 increases in rpm, the effective pulley diameter increases. As centrifugal pulley 44 increases in rpm, the effective pulley diameter is reduced. A sprag clutch 46 rides on drive shaft 48 and is connected to pulley 44. Pulley 44 through sprag clutch 46 engages the drive shaft 48 which extends through differential 50 and extends to the motor shaft (not shown) of the motor generator 52. The drive axles 56A and 56B, for the wheels 20, are also connected to the differential 50 and are driven by the differential. The differential in turn is driven by shaft 48 and either driven by motor generator 52 or engine 34 as described herein.

The motor generator 52 drives shaft 48, but it does not drive centrifugal pulley 44 because the sprag clutch does not engage shaft 48 when shaft 48 is being driven by the motor generator. When the engine 34 is operating, the gas engine drives centrifugal pulley 38 and endless belt 42 which in turn drives pulley 44. In that mode of operation, the sprag clutch 46 connected to pulley 44 engages and drives drive shaft 48. This in turn drives the differential 50 and drives the drive axles 56A and 56B. In other words, shaft 48 when powered by the motor generator cannot engage sprag clutch 46 to turn pulley 44. However, when pulley 44 is turned by endless belt 42, the sprag clutch 46 engages and drives shaft 48.

For operation, the on/off switch 68 is turned on and sends a signal via line 70 to the control box 30. The control box monitors the voltage of the battery continuously when it is on. If the battery is above a threshold voltage, about 35 volts, the controller when the on/off switch is turned on, activates vehicle operation by the motor generator in the motor mode. If the control box determines that the voltage is above 35 volts for the battery 24, it will not start the engine 34. It will let the vehicle operate in the electric mode to be describe below. If the control box determines that the voltage is below 35 volts for the battery, then it starts the engine 34 by activating starter 32. The starter 32 operates for a predetermined period and then stops to prevent the starter from being burned out. The control box via sensor on the engine (not shown) will determine if the engine is started and running. If the engine has not started, after a predetermined second period, the control box will again activate the starter 32 and repeat the above process until the engine starts. The same operation is carried out in the manual override modes described herein and when, during vehicle operation, the battery falls below about 35 volts or when the vehicle has been in reverse and the reverse switch is turned off so the vehicle 10 can be driven forward again and the battery is below 35 volts.

The vehicle is fitted with a manual override switch 74 which has two on modes or settings. The manual override switch can either be off or it can be on, in one of two on modes. In the first on mode, the manual override switch sends a signal via line 76 to controller 30 to start the engine 34 for operation of the vehicle with the engine. The control box will start the engine and switch the motor generator from the motor mode to the generator mode. In the second on mode, the control box will not activate the engine 44, rather it will have the vehicle operated in the electric mode employing the motor generator in the motor mode and kill or turn off the engine (stop it).

The vehicle is also fitted with a reverse switch 78 connected to the control box via line 80. When the reverse switch 78 is activated, it sends a signal to the control box 30 which overrides all other signals being sent to the control box if other signals are being sent to the control box. When the reverse switch is activated or turned on, the control box kills the ignition or stops the engine 34 if it is operating and switches operation of the motor generator from the generating mode, if it is operating in that mode, to the motor mode in the reverse direction. This permits the vehicle to be reversed or backed up when the situation requires it. When the reverse switch is turned off, the control box will return to its previous mode of operation depending upon whether automatic operation has been activated, or manual override operation, or off. The ability to reverse the vehicle is an important element or benefit of the present invention. In order to accomplish this, the battery 24 cannot be allowed to be completely discharged. For that reason, a threshold voltage has been set around 35 volts. The battery, when fully charged, is about 48 volts. When the battery pack voltage falls below about 35 volts, the control box in automatic operation will automatically start up the gasoline engine and convert the motor generator from the motor mode to a generating mode. Manual override can override this automatic operation, but if the voltage of the battery is below 35 volts, a warning signal will be given by an alarm (not shown). If the batteries are fully charged, the controller, which senses the battery charge status, will not carry out the manual override to start the engine and thus charge the battery to prevent over-charging the battery. The alarm can be either an optical alarm, such as a flashing light, and/or a sound alarm. When the battery has been fully charged by the engine, the battery is above 48 volts, the controller turns off the engine and turns on the motor generator in the motor mode.

During operation of the vehicle, either in the automatic mode or the manual mode, or the reverse mode, the speed of the vehicle is controlled by an accelerator 62. Accelerator 62 sends out a signal to the control box 30 by line 68 and to the engine 34 by line 64. Optionally, the signal can be sent to the controller and the controller then sends power control signals to the motor or engine. Depending upon the operation mode, the accelerator with either control the speed of the engine 34 or the speed of the motor 52. The engine and the motor generator in the motor mode do not operate simultaneously in any mode of operation.

In operation, most of the time, the system will be operated in the automatic mode controlled by the microprocessor in control box 30. The vehicle will be turned on by on/off switch 68. The control box or controller 30 will monitor the voltage of the battery 24 and if the battery 24 is above the threshold voltage, it will operate the vehicle with the motor 52. The default mode for motor generator 52 is the motor mode, and the engine 34 will not be started. Motor generator 52, the speed of which will be controlled by accelerator 62, drives shaft 48 which drives the differential 50 which in turn drives the power axles 56A and 56B and the wheels 20. If the voltage of the battery 24 is below the threshold voltage, the control box 30 will start up the engine 34 by a signal through line 72. It will shift the operating mode of motor generator 52 into the generating mode. Engine 34 turns shaft 36 and pulley 38. Pulley 38 drives endless belt 42 which drives pulley 44. Sprag clutch 46 when driven by pulley 44 engages shaft 48 which drives differential 50 and drives the motor generator 52 in the generating mode. The drive axles 56A and 56B are driven by the differential. The current generated by the motor generator is used to charge the battery 24.

If the operator of the vehicle comes to a situation where he or she has to back up, they activate switch 78, in other words turn it on, which sends a signal to control box 30. If the vehicle is already in the motor mode, the control box reverses the polarity to the motor generator 52 reversing direction of the motor generator which reverses direction of the differential and the drive axles 56A and 56B to reverse the vehicle. If the vehicle is operating in the engine mode, control box 30 kills the ignition of the engine 34 and switches the operating mode of the motor generator 52 to the motor mode in the reverse direction. Since the battery 24 is never fully discharged, there is sufficient current to power motor 52 in the reverse direction, at least for a limited distance and for a limited time. After the back up operation has been made, and the reverse switch turned off, the vehicle returns back to its mode of operation before activation of the reverse switch. As mentioned above, when the motor generator is operating in the motor mode and driving shaft 48 in the forward direction or the reverse direction, clutch 48 does not engage shaft 48 and thus pulley 44 is not turned by shaft 48 being driven by the motor generator.

As mentioned above, the manual override switch has two modes of on operation, first mode on, and a second mode on. The default is to have the manual override switch off. If the vehicle is in the engine mode, the manual override switch can be utilized to convert operation from the engine mode to the motor mode. If the vehicle is in the motor mode, the manual override switch can be utilized to convert operation of the vehicle to the engine mode. The engine mode can be useful when greater speeds are required, or if the vehicle is going to be driven a substantial distance which will exhaust the battery.

Figure 4:
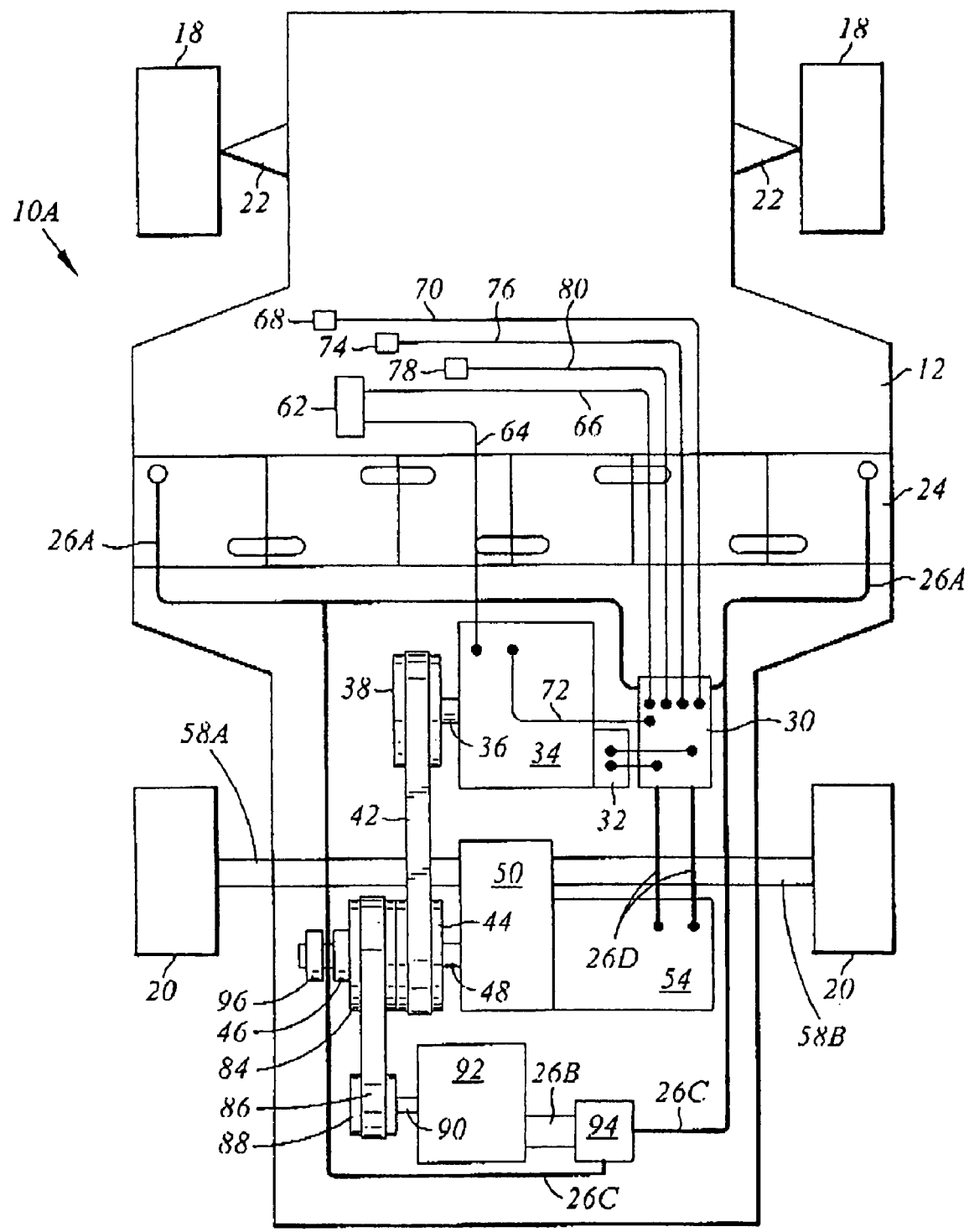
FIG. 4 is similar to FIG. 1 and illustrates another embodiment of the hybrid golf car type vehicle of the present invention.

Referring to FIG. 4, FIG. 4 illustrates the preferred embodiment of the hybrid golf car vehicle of the present invention. For those components that are identical to the components shown for the vehicle in FIG. 1, the same numbers are used and it is not required to redescribe them here. The vehicle 10A of FIG. 4 does not utilize a reversible motor generator 52, but rather it utilizes an electric motor 54 which is reversible. The operation of vehicles 10 and 10A are identical with regard to turning on and off employing the manual override switches, activating the reverse switch, and using the accelerator. The difference between the two vehicles is that vehicle 10 employs a motor generator 52 whereas vehicle 10A employs an electric motor 54 and an alternator 92, preferably a permanent magnet alternator. A generator can be used in place of an alternator. Shaft 48 in vehicle 10A is extended farther out to receive a second pulley 84 which is connected to pulley 88 be endless belt 86. Pulley 88 is connected to shaft 90 which extends out from alternator 92. The sprag clutch 46 operates in the same manner that the sprag clutch 46 operates in vehicle 10. However, sprag clutch is connected to both pulleys 84 and 44 and sprag clutch only engages shaft 48 when pulley 44 is being driven by engine 34. In vehicle 10A when electric motor 54 is operated, the shaft 48 does not engage sprag clutch 46 and pulleys 84 and 44 are not turned. However when engine 34 is operated and endless belt 42 rotates pulley 44, sprag clutch 46 is engaged and engages shaft 48 to turn differential 50. Preferably, the end of shaft 48 is supported by a bearing 96 because of its length. Bearing 96 may be eliminated if shaft 48 is robust enough to prevent bending motions and the bearing in the differential can support the radial forces on the shaft. The current from the alternator 92 is fed to a voltage regulator 94 via lines 26B. The output from the voltage regulator 94 is fed to battery 24 via battery cables 26A through cables 26C.

Figure 2:
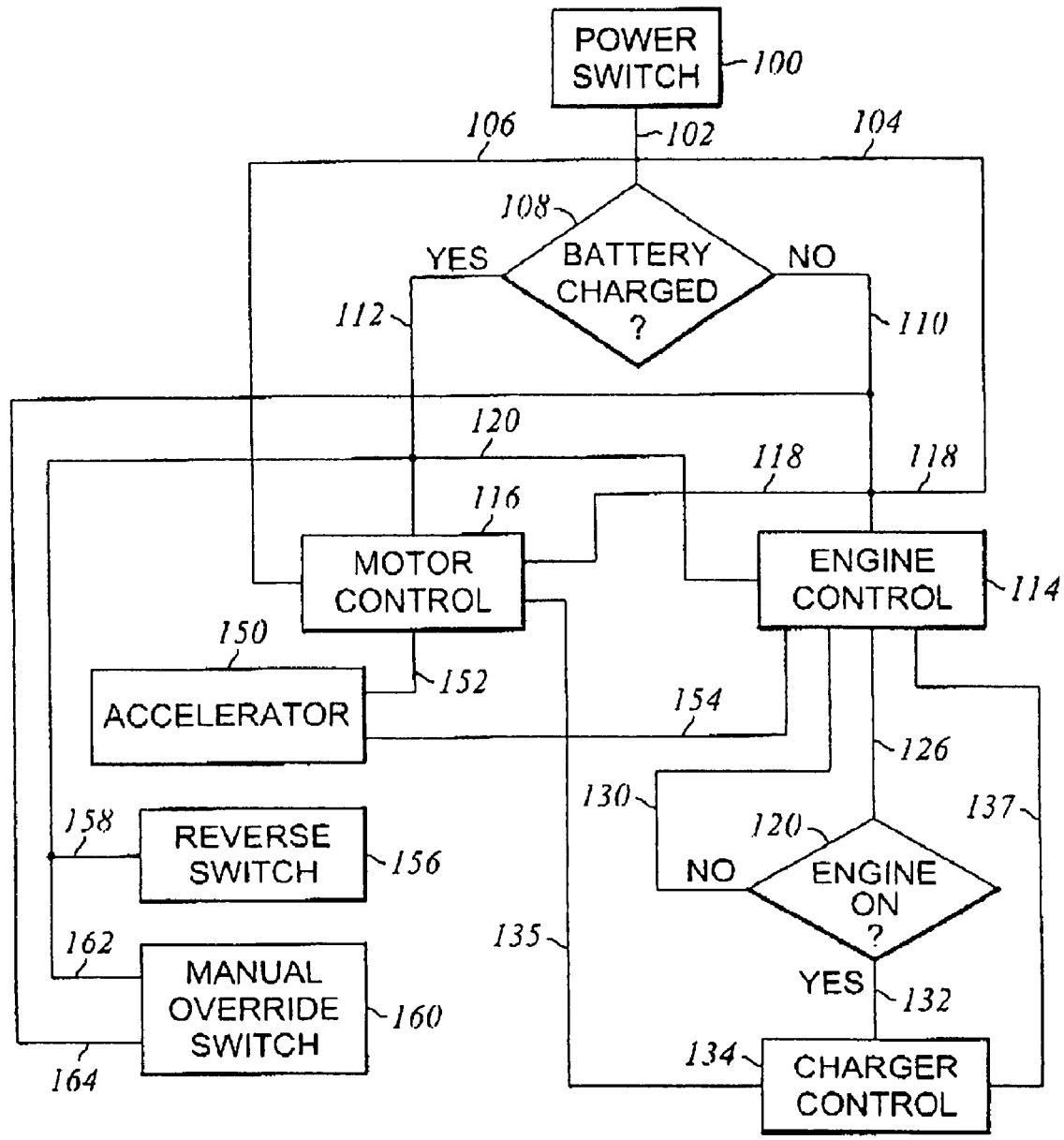
FIG. 2 is a flow chart illustrating the operation of the hybrid golf car type vehicle system of the present invention.

Referring to FIG. 2, a diagram showing the control path of the utility runabout 10 as illustrated. When the power switch 100 is turned on, the charge status of the battery 108 is checked via signal 102. If the battery is not sufficiently charged, a signal 110 is sent to engine control 114 commanding start up of the gasoline engine. The signal 110 is also sent via line 118A to the motor control 116 deactivating the motor control. The battery charge is periodically checked via signals 118, 104 and 108. Motor control 116 interrogates the engine control 114 to determine the engine status (on or off). The engine control interrogates the engine status 128 via signal 126. If the engine is running, a signal 132 is sent to the charger control 134 commanding the motor generator to operate in the charging mode. If a motor and separate alternator or generator are used (FIG. 4), a charger control can be optional. The charger control 134 controls the charger operation of the motor generator. If the engine is not on, a signal 130 is sent to the engine control commanding the control to attempt to restart the engine. This is repeated until the engine starts. If the battery has sufficient charge, a signal 112A is sent to the motor control 116 activating motor control. The motor control controls the status of the electric motor or motor generator. A signal 112B is also sent to the charger control to deactivate the charger operation of the motor generator. The accelerator 150 for the hybrid utility runabout is connected to the motor control and to the engine control. When the battery does not have a sufficient charge, the accelerator can only operate the engine control because the motor control receives a signal 135 deactivating the motor control. In contrast, when there is sufficient battery charge, the accelerator can only operate the motor control because the engine control is deactivated by the signal 137.

When the hybrid utility runabout has to be reversed, it is reversed by the motor or the motor generator and not by the gasoline engine. The system is designed never to exhaust the batteries. A determination is made whether the battery is charged above or below 35 volts. When the voltage of the batteries drops below 35 volts, then the engine control takes over. When the battery charge is 35 volts or more, the motor control takes over.

When the vehicle must be reversed, the reverse switch 156 is activated and the reverse signals 158 and 120B are sent to the motor control 116 activating the motor control for reverse movement. The signals 158, 120A and 120B are sent to the engine control 114 commanding the engine ignition to be killed and deactivating the engine control. Normally, a reverse operation is only for very short distances and for very brief period of time and a weak battery charge can handle the operation.

The manual override switch 160 permits operation of either the gasoline engine or the motor generator. The override switch 160 if switched to motor or motor generator power, sends signals 162 and 120B to the motor control 116 activating the motor control 116 and signals 162, 120B and 120A are simultaneously sent to the engine control 114 deactivating the engine control. If on the other hand the operator wishes to operate the vehicle with the gasoline engine, signal 164 is sent to the engine control 114 activating the engine control and signal 164 is sent to the motor control 116 deactivating the motor control. The reverse switch 156 overrides the manual override switch 160 and automatic operation and control.

The power switch 100 also can send a signal 106 to the motor control to permit control of the motor via accelerator 150. The accelerator sends a signal 152 to the motor control to control the power output of the motor and it also sends a signal 154 to the engine control to control the power output of the engine. If the motor or motor generator is in the motor mode, the signal 152 controls the power of the motor. If the motor generator is in the generating mode and the engine is on, the signal 154 controls the power output of the engine. In the startup phase of the engine, the sensor on the engine sends a signal 126 to the engine control regarding the on/off status of the engine. If the engine is not started, a signal is sent to the engine control and the engine control after a predetermined period of time will initiate the starting operation again until such time as the engine is operating. When the engine is on, it sends a signal 132 to the charger control 134 which switches operation of the motor generator from the motor mode to the charging mode. A charger control is not required when a separate alternator or generator is utilized rather than a motor generator.

When the vehicle illustrated in FIG. 4 is utilized, there is no need to switch the operating mode of the motor during operation of the vehicle in automatic operation or mode, reverse mode or manual mode since the motor is a straight motor and have no generating mode. The alternator or the generator will automatically produce current to charge the battery 54 when the engine operation is initiated.

Figure 3:
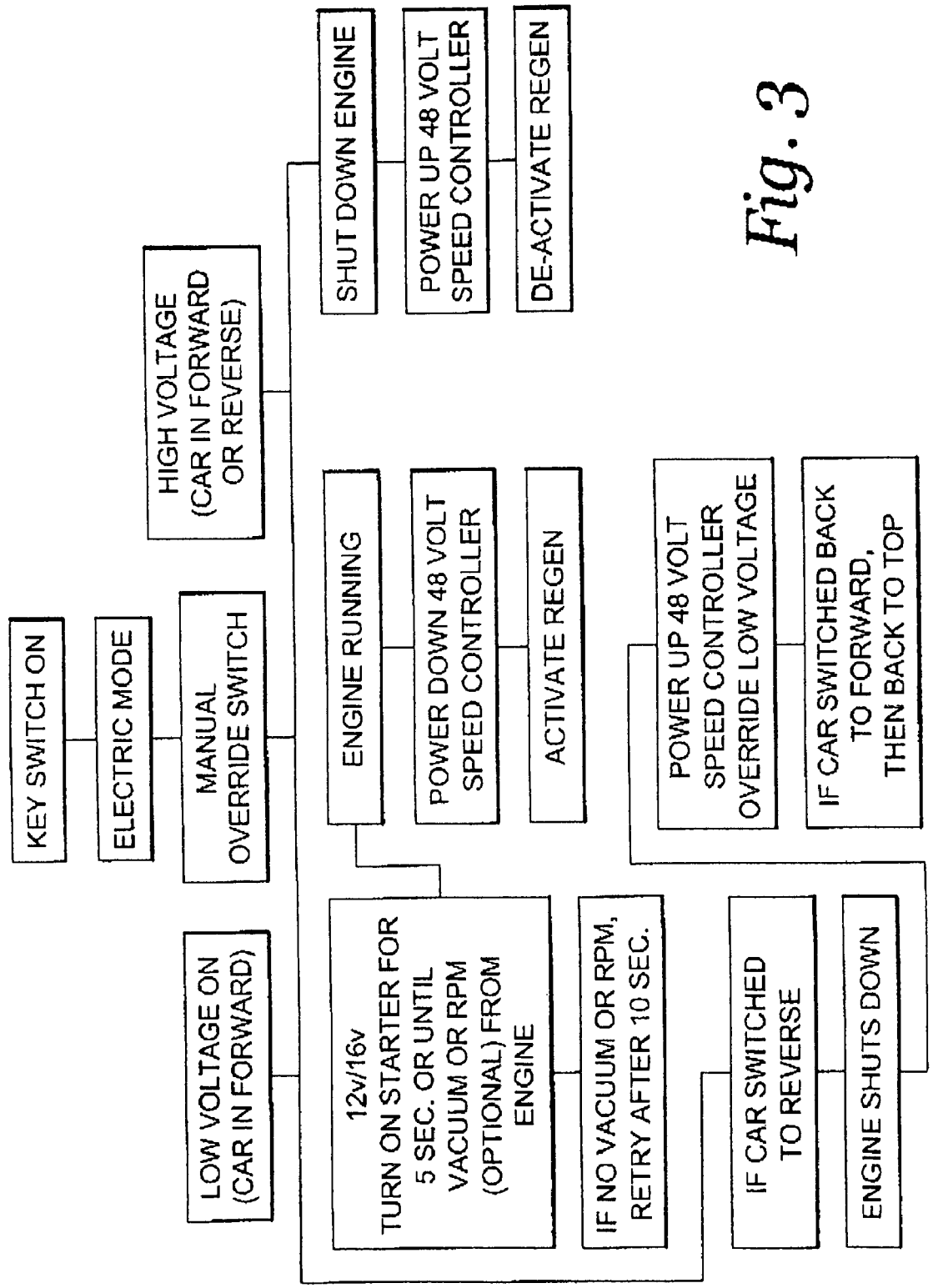
FIG. 3 is a flow chart of the operation commands of the present invention.

Referring to FIG. 3, the hybrid flow chart is illustrated which shows that when the on/off switch (key switch) is turned on, it initiates the default the electric mode where operation of the vehicle is carried out with an electric motor or motor generator. The default mode can be interrupted by the manual override switch as described above. The system automatically monitors the voltage of the battery. If there is low voltage in the battery, the system automatically turns on the starter for 5 seconds, or until it monitors an engine vacuum or an rpm threshold for the engine which indicates that the engine has started up. If no vacuum is detected or the rpm's are not reached, the system automatically will retry to start the engine after 10 seconds. If the engine is running, the system powers down the 48 volts speed controller and activates the regen or generation mode of the motor generator. If during the low voltage mode where the engine is operating as an engine, and the operator wishes to reverse the vehicle, the operator activates a reverse switch and the system switches the vehicle to reverse which involves shutting down the engine, powering up the 48 volts speed controller which overrides the low voltage status of the battery to permit reversing of the vehicle with the motor generator in the motor mode in a reverse direction as described above. If or when the car is switched back to a forward motion, in other words if the reverse switch is turned off, then operation of the vehicle is returned to the low voltage mode described above.

If when the key switch is turned on for automatic mode of operation and the battery is monitored to have a high voltage or a voltage above the threshold voltage, the engine will not be started up, or if the engine is running, it will be shut down. The system will power up the 48 volts speed controller and deactivate the regen or generation mode by switching the motor generator from the generating mode to the motor mode to operate the vehicle with the motor generator in the motor mode.

As described above, the manual override can reverse the above operation by switching from electric mode or motor mode to engine mode or vice versa as described herein.

The sprag clutch transmits power to the drive shaft but not vice versa. Thus, when the vehicle is being operated with the gas engine, the sprag clutch 48 connected to pulley 44 engages shaft 48 and drives the motor generator in the generating mode and drives the vehicle through differential 50. However when the gasoline engine has ignition off, the drive shaft 48 is driven by the motor 54, or by the motor generator 52 in the motor mode, through differential 50. In this mode the sprag clutch will not engage shaft 48 and pulley 44 will not be driven by shaft 48.

The invention claimed is:

1. A hybrid golf car type vehicle comprising an engine with on and off modes, the engine off mode being the default mode; a reversible motor operable in a forward or reverse direction, the motor in the forward direction being the default mode; a drive shaft connected to the motor, the motor driving the drive shaft in a forward or reverse direction; a differential connected and driven by the drive shaft; two independent power axles connected to and driven by the differential; a directional drive train connecting the engine to the drive shaft, the engine driving the drive train and the drive shaft in the forward direction when the engine is turned on and the motor is turned off, and the motor driving the drive shaft in the forward or reverse direction when the motor is turned on and the engine is turned off; a battery to power the motor; and an alternator connected to and driven by the drive shaft when the engine drive the drive shaft, the alternator charging the battery.

2. The hybrid golf car type vehicle according to claim 1 including a controller monitoring the voltage of the battery and adapted to start the engine and turn off the motor if turned on when the battery charge drops below a predetermined voltage, and to turn off the engine if operating and turn on the motor when the battery charge is at least 48 volts.

3. The hybrid golf car type vehicle according to claim 2 including an on/off switch adapted when turned on to turn on the motor in a forward direction when the battery charge at least equals the predetermined voltage, or to start the engine when the battery charge is less than the predetermined voltage, and when the on/off switch is turned off to turn off the motor and the engine.

4. The hybrid golf car type vehicle according to claim 2 wherein the on/off switch is directly connected to the controller and the on/off switch when turn on sends a signal to the controller which carries out the automatic operation of the vehicle.

5. The hybrid golf car type vehicle according to claim 2 including a reverse switch, the reverse switch connected directly to the controller and the controller carrying out the reverse operation.

6. The hybrid golf car type vehicle according to claim 2 including a manual override switch having a first on mode, the manual override switch connected directly to the controller and the controller carrying out the operation of the first on mode which turns off the engine if operating and turns on the motor in the first direction regardless of the battery charge.

7. The hybrid golf car type vehicle according to claim 2 including a starter motor to start the engine, the starter motor connected to the controller and the controller activating the starter motor, for a predetermined time, to start up the engine when operation of the vehicle requires the engine to be turned on.

8. The hybrid golf car type vehicle according to claim 7 wherein the controller monitors the on/off status of the engine and activates the starter motor periodically until the engine starts.

9. The hybrid golf car type vehicle according to claim 1 including a reversing switch adapted when activated to stop the engine if operating and turn on the motor in the reverse direction or if the motor is turned on switching the motor to the reverse direction.

10. The hybrid golf car type vehicle according to claim 9 including a controller having a microprocessor, the controller monitoring the battery charge and the on/off status of the engine, the controller controlling operation of the engine and motor, the reverse switch connected to the controller and the controller carrying out the reverse operation.

11. The hybrid golf car type vehicle according to claim 10 including an accelerator to control the power of the motor and engine, the accelerator connected to the controller and the controller carrying out control of the power of the motor when the motor is turned on and controlling the power of the engine when the engine is turned on.

12. The hybrid golf car type vehicle according to claim 1 including a manual override switch which can be turned on to a first on mode which turns off the engine if operating and turns on the motor in the forward direction regardless of the battery charge.

13. The hybrid golf car type vehicle according to claim 12 wherein the manual override switch can be turned on to a second on mode which turns off the motor if operating and turns on the engine regardless of the battery charge.

14. The hybrid golf car type vehicle according to claim 1 including an accelerator adapted to control the power of the motor generator when the motor is turned on and to control the power of the engine when the engine is turned on.

* * * * *